April 21, 1959  J. F. HEDGE ET AL  2,882,926
FLOW CONTROL VALVE
Filed Feb. 11, 1954  4 Sheets-Sheet 1

INVENTORS
CECIL E. ADAMS
JOHN F. HEDGE
BY
Herschel C. Omohundro
attorney

April 21, 1959  J. F. HEDGE ET AL  2,882,926
FLOW CONTROL VALVE
Filed Feb. 11, 1954  4 Sheets-Sheet 2
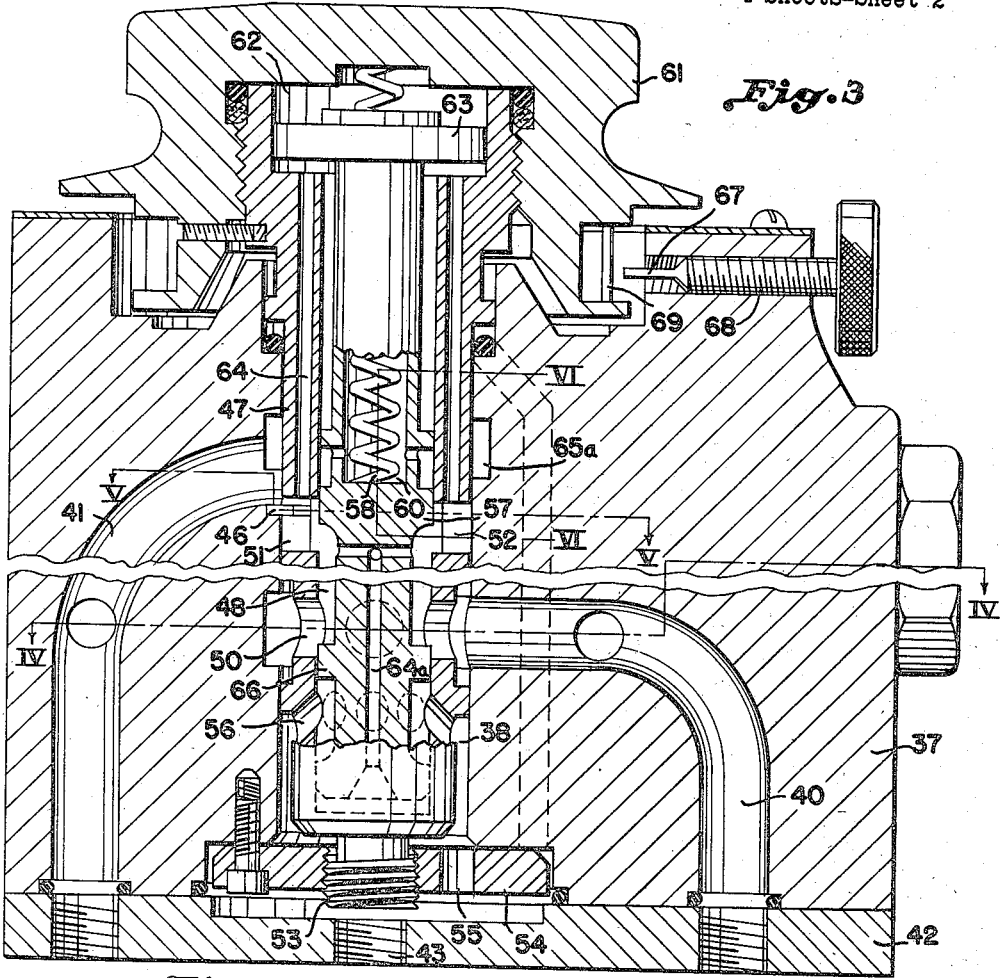
Fig. 3
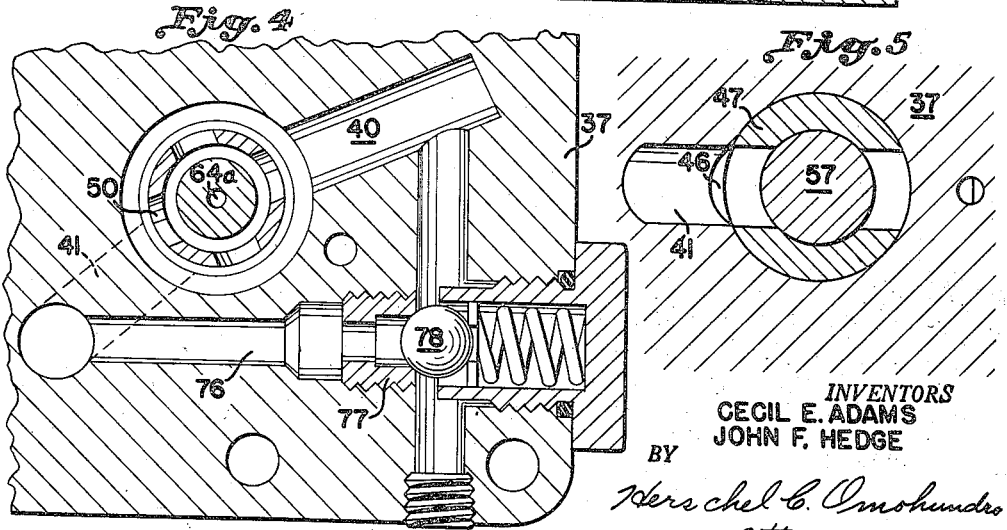
Fig. 4
Fig. 5
INVENTORS
CECIL E. ADAMS
JOHN F. HEDGE
BY
Herschel C. Omohundro
attorney April 21, 1959 J. F. HEDGE ET AL 2,882,926
FLOW CONTROL VALVE
Filed Feb. 11, 1954 4 Sheets-Sheet 3

INVENTORS
CECIL E. ADAMS
JOHN F. HEDGE
BY
Herschel C. Omohundro
attorney

April 21, 1959 J. F. HEDGE ET AL 2,882,926
FLOW CONTROL VALVE
Filed Feb. 11, 1954 4 Sheets-Sheet 4

INVENTORS
CECIL E. ADAMS
JOHN F. HEDGE
BY
Herschel C. Omohundro
attorney

United States Patent Office 2,882,926
Patented Apr. 21, 1959

2,882,926

FLOW CONTROL VALVE

John Franklyn Hedge and Cecil E. Adams, Columbus, Ohio, assignors, by mesne assignments, to American Brake Shoe Company, New York, N.Y., a corporation of Delaware Application February 11, 1954, Serial No. 409,722

5 Claims. (Cl. 137—552)

This invention relates generally to hydraulic apparatus and is particularly directed to fluid control valves. Still more particularly, the invention is directed to flow controls of the type shown in the co-pending application of Cecil E. Adams, Serial No. 33,906, filed June 18, 1948 now Patent No. 2,673,422 dated March 30, 1954, of which this application is a continuation-in-part.

An object of this invention is to provide a flow control valve having the advantages of the valve shown in the copending application mentioned above but being of simplified construction to the extent of having a single operating part to change from one range of operation to another and for changing the capacity of the valve from zero to the rated maximum capacity in any of the ranges selected.

Another object of the invention is to provide a flow control valve having a body with a passage extending therethrough and an orifice in the passage, means being provided for changing the potential maximum size of the orifice thus changing the range of operation and further providing means responsive to pressure differentials at the inlet and outlet sides of the orifice to control the flow through the passage, means also being provided to vary the size of the orifice from zero to maximum in the selected orifice size.

A further object of the invention is to provide a flow control valve having a body with inlet and outlet ports and a liner or cartridge which is adjustable in the body to form a variable orifice in a passage provided by the inlet and outlet ports and the liner, the latter being adjustable in two directions in the body so that one dimension of the orifice may be changed to vary the size of the orifice from fully closed to fully open positions while maintaining another dimension of the orifice substantially unchanged, the adjustment of the liner in the second direction serving to change the second dimension of the orifice to vary the potential maximum size of the orifice, the first adjustment also serving to change the orifice from fully closed to fully opened positions in the latter settings.

A further object of the invention is to provide a flow control valve having a body with an internal bore and inlet and outlet ports communicating therewith at longitudinally spaced points in the bore, the bore receiving a liner which is provided with openings selectively registrable with the outlet port to form a variable orifice, the liner being supported in the body for rotary movement, partial rotation serving to vary the orifices formed by the openings when either registers wtih the outlet port from fully closed to fully open position, means being provided in the body to cause the liner to gradually move longitudinally in the bore whereby the orifices formed by the various openings and the outlet port will be of different height, the height determining the potential maximum size of the orifices.

Another object of the invention is to provide a flow control valve of the type mentioned in the preceding paragraph with means actuated by the rotation of the liner to indicate the potential maximum size of the orifice selected.

Another object is to provide the flow control valves mentioned in the preceding paragraphs with a check valve controlled passage to permit reverse flow through the flow control valve.

Further objects and advantages of the present invention will be apparent from the following description, reference being had to the accompanying drawings wherein a preferred form of embodiment of the invention is clearly shown.

In the drawings:

Fig. 3 is a vertical sectional view taken through the flow control valve on the plane indicated by the line III—III of Fig. 2.

Fig. 4 is a detail horizontal sectional view taken on the plane indicated by the line IV—IV of Fig. 3.

Fig. 5 is a detail horizontal sectional view taken through the valve on the plane indicated by the line V—V of Fig. 3.

Figure 1:
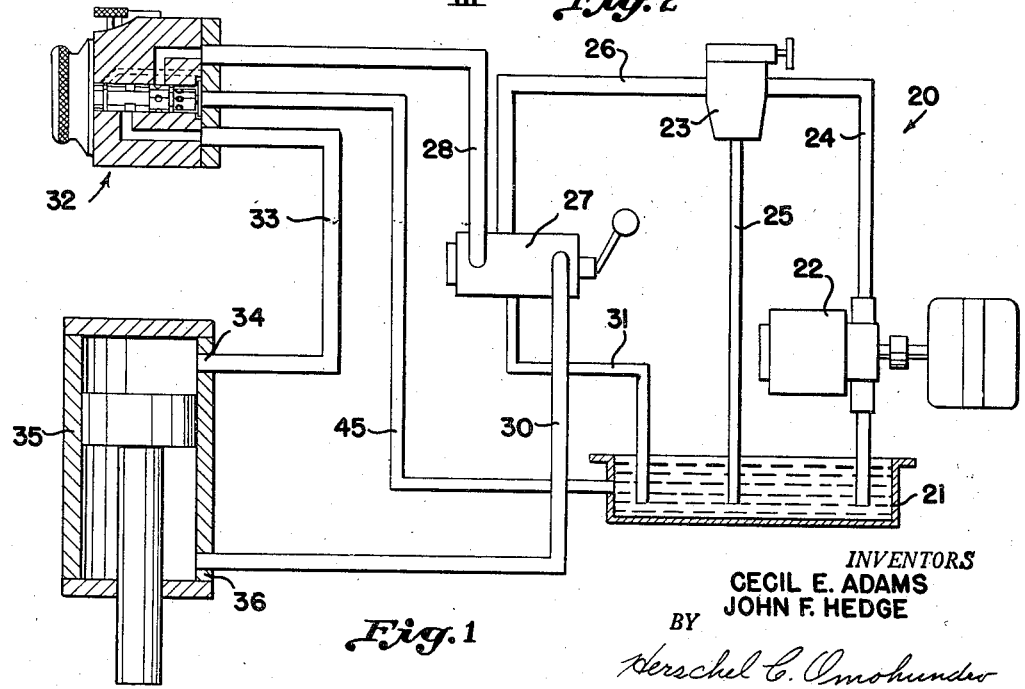
Fig. 1 is a diagrammatic view of a hydraulic circuit provided with a flow control valve formed in accordance with the present invention.
Figure 9:
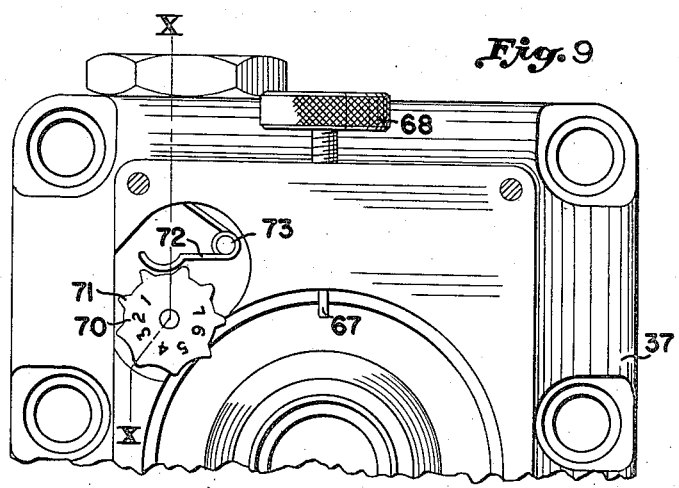
Fig. 9 is a plan view of a portion of the valve shown in Figs. 2 and 5 with the control knob and cover plate removed.
Figure 10:
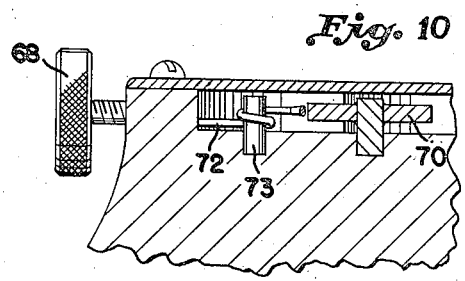
Fig. 10 is a fragmentary vertical sectional view taken through a portion of the valve on the plane indicated by the line X—X of Fig. 9.
Figure 11:
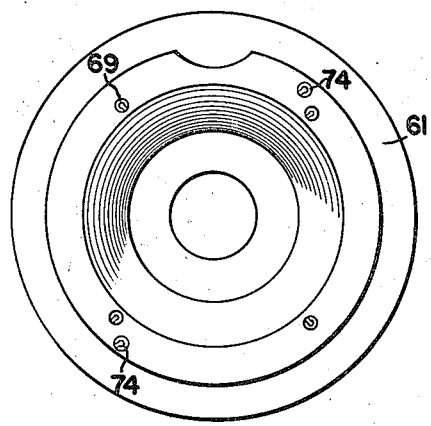
Fig. 11 is an elevational view of an operating knob used on the flow control valves, this view being taken from the bottom of the knob.

Referring more particularly to the drawings, the numeral 20 designates the hydraulic system illustrated in Fig. 1. This system is substantially conventional in character and includes a reservoir 21, a motor driven pump 22, a relief valve 23 connected with the outlet of the pump 22 by a line 24 and a return line 25 extending from the relief outlet of the relief valve 23 to the reservoir. A pressure line 26 extends from the relief valve to the inlet port of a four-way valve 27, a pair of work lines 28 and 30 leading from this four-way valve to the apparatus to be controlled. An outlet line 31 also leads from the four-way valve 27 back to the reservoir 21. Line 28 leads to the inlet port of the flow control valve 32 forming the subject matter of this invention. A line 33 extends from this valve to the forward motor port 34 of a hydraulic cylinder 35, the reverse motor port 36 of this cylinder being connected with the line 30 leading from the four-way valve. It should be obvious that, although a cylinder and piston type reversible fluid motor for securing linear movement has been illustrated, the flow control valve forming the subject matter of the invention is equally applicable for use with rotary motors.

The flow control valve 32 is illustrated in detail in Fig. 3. It includes a body 37 formed in any suitable manner, such as by casting, the body having a vertically extending bore 38 formed therein. This bore is open at both ends and communicates, at longitudinally spaced points, with inlet and outlet ports or passages 40 and 41.

The ports 40 and 41 terminate at the bottom surface of the body 37 for registration with other ports formed in a sub-plate 42. This sub-plate has a port 43 formed therein also for communication with the lower end of the bore 38, the port 43 being connected, when the valve is assembled in a hydraulic system, with a line 45 (see Fig. 1) extending to the reservoir 21. As illustrated in Fig. 5, the casing 37 has a recess 46 formed therein adjacent the point of communication of outlet port 41 with the bore 38; the purpose of this recess will be apparent from the following description.

Bore 38 is formed to rotatably receive a liner member 47, this liner member closely fitting the bore and having a hollow interior 48 which is connected with the inlet port 40 by transverse ports 50 formed in the liner and with the outlet port or the recess 46 by either of a pair of openings 51 and 52 formed in the side of the liner. The openings 51 and 52 are rectangular in configuration and cooperate with the recess 46 to form a rectangular opening or orifice having relatively sharp edges. It will be obvious from Fig. 5 that a partial rotation of the liner will vary the width of the orifice between fully closed to fully open conditions. The liner has a closed lower end in both forms of the invention, the bottom of the liner being provided with a threaded extremity 53. The threads selected are of a very fine pitch so that the partial rotation of the sleeve between orifice opening and closing positions will not cause appreciable longitudinal movement of the liner in the bore. More extended rotation of the liner, however, will cause relative longitudinal movement in the bore so that the orifices formed by the openings 51 and 52 will be of different heights and consequently different potential maximum sizes. A number of revolutions of the liner will, therefore, provide a relatively wide selection of orifice heights and potential maximum sizes. The threaded projection 53 is received in a plate 54 which is secured to the underside of the body 37 in a counterbored portion of the bore 38. The plate 54 is stationarily held so that, when the liner is rotated, longitudinal movement will be imparted thereto. The plate is provided with one or more openings 55 which permit fluid to flow from the bore 38 to the port 43, this fluid being conducted through line 45 to the reservoir 21. The liner is formed with a plurality of openings 56 which connect the hollow interior of the liner with the bore 38 at the lower end of the liner.

In the form of the invention shown in Figs. 1 to 4, inclusive, the flow control valve 32 regulates the volume of fluid permitted to flow through the outlet port 41 by by-passing some of the fluid admitted through the inlet port 40 to the lower end of the bore 38 through ports 56 and permitting this fluid to flow to the reservoir. This by-passing of fluid is regulated by a spool valve 57 disposed for longitudinal sliding movement in the liner 47. The spool valve moves in response to variations in the pressure differential caused by the orifice 46, the pressures at the inlet and outlet sides of the orifice being applied to opposite ends of the spool valve to effect this movement. The spool valve is normally urged toward a position providing for maximum flow of fluid from the inlet 40 to the outlet 41 by a coil spring 58 disposed in a socket 60 formed in the upper end of the spool valve, the spring engaging the inner end of the socket and the under surface of the top wall of an adjusting knob 61 secured by screw threads to the upper end of the liner. This end of the liner has a cylinder 62 formed therein to receive a piston head 63 formed on the spool valve. The liner is provided with a pair of passages 64 which conduct fluid from the inlet side of the orifice to the lower end of the piston chamber 62, this same pressure being applied through a passage 64A in the lower portion of the valve spool to a space between a head on the lower end of the spool and the closed inner end of the liner. This head and the under side of the piston 63 are thus exposed to fluid pressure which tends to move the spool in an upward direction against the action of the spring 58.

Figure 6:
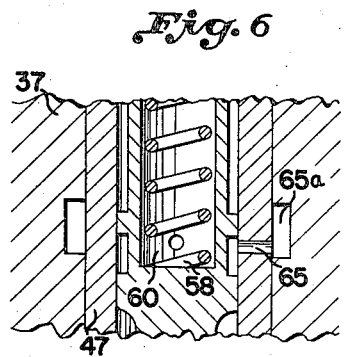
Fig. 6 is a fragmentary detail vertical sectional view taken on the plane indicated by the line VI—VI of Fig. 3.

Fluid pressure from the outlet side of the orifice is conducted to the space between the upper surface of the piston 63 and the knob 61 through a port 65 (see Fig. 6) formed in the side wall of the liner in registration with the outlet port or a groove 65A connected therewith, and with an annular groove formed in the spool. A pair of ports extend from this annular groove to the interior of the spool and through the socket 60 to the upper end of the spool. This pressure assists the spring 58 in urging the spool valve in a downward direction.

In the operation of the device, a volume of fluid which is in excess of that required at the outlet port 41 is introduced into the flow control valve 32 through the inlet port 40 and this fluid flows through the ports 50, the interior of the liner 47 and that opening 51 or 52 therein which is then registering with the recess 46. That opening 51 or 52 which is registering with the recess 46 and the recess cooperate to form an orifice and from this orifice the fluid flows through the outlet port 41. As fluid flows through the orifice, a pressure differential is created and the higher pressure of this pressure differential which is at the inlet side of the orifice is applied to the underside of the valve spool 57 and the piston 63 while the lower pressure of the pressure differential which is present at the outlet side of the orifice is applied to the upper end of the valve spool 57 through the piston 63. Since the higher pressure of the pressure differential urges the spool upwardly and the lower pressure acting in concert with the spring 58 urges the spool downwardly, the spool will be moved to a position where the opposite forces acting upon it will be in equilibrium and when the spool is in this position that quantity or volume of fluid which is entering the valve 32 through the port 40 that is in excess of that required to produce the pressure differential at the orifice is by-passed to tank through a by-pass valve formed by the head or land 66 on the spool and the ports 50, the interior of the liner 47, ports 56, the interior of the bore 38, port 55, port 43 and line 45. If the volume admitted should tend to increase thereby tending to increase the higher pressure of the pressure differential, the spool will be moved upwardly to increase the volume of fluid flowing through the by-pass passageway. If the pressure at the outlet side of the orifice should tend to fall and the differential tend to increase, the spool would be moved to decrease the volume of fluid flowing through the by-pass passageway. The opposite result will be secured if the pressures should tend to change in the opposite directions.

It will be noted that the head or land 66 of spool 57 is narrower than the diameter of the ports 50. This arrangement is provided so that, when the spool moves in an upward direction a sufficient distance, the head 66 will move beyond the lower edges of the ports 50 and permit some of the fluid introduced through the inlet passage 40 to flow into the space at the lower end of the bore 38, this fluid flowing through the ports 56. As previously pointed out, this bypassed fluid flows from the lower end of the bore 38 through the ports 55 and 43 and through line 45 to the reservoir.

It has previously been pointed out that the liner is provided with a pair of openings 51 and 52 either of which form, in cooperation with the recess 46, the variable orifice. When either of these ports registers with the recess 46, the width of the resulting orifice may be changed from fully open to fully closed condition by a partial rotation of the knob 61. A stop pin 67 formed on the end of a thumb screw 68 cooperates with other pins 69 provided in spaced relation on the knob 61 to limit the movement of the knob in the orifice width changing operation. These pins are so spaced that the knob may be moved a distance sufficient to change the width of the orifice between fully open and fully closed conditions. Two sets of such pins are provided on the knob, one set for each of the orifice forming openings. Only one of these openings is employed at a time.

When it is desired to change the maximum potential size of the orifice, the thumb screw 68 is turned outwardly to withdraw the pin 67 on the inner end thereof from the path of movement of the pins 69 in the knob 61. This knob may then be turned to rotate the liner to cause the registration of the other of openings 51 and 52 with the recess 46 to form another orifice. As the liner is rotated, the threaded connection thereof with the plate 54 causes the liner to move longitudinally in the bore 38, this movement serving to vary the maximum potential size of the orifice. This variation changes the height dimension of the orifice. After the proper potential maximum size has been selected, the thumb screw 68 is again moved into the body 37 to position the pin 67 at the inner end thereof in the path of movement of the stop pins 69.

To indicate which of the potential maximum orifices are in use at any particular time, the valve is provided with an indicating mechanism. This mechanism comprises a rotatably mounted, numbered disk 70 having a plurality of teeth or projections 71 spaced around its periphery. These projections serve a dual purpose in that the spacing provides a recess for the end of a spring 72 used to retain the disk in various positions of adjustment. In each of such positions, the proper number to indicate the setting of the orifice to secure a particular range of operation will be viewable through a sight opening 70A formed in the plate on top of the body 37. The spring 72 is looped around a pin 73 which is set in the body 37 for this purpose. One end of the spring engages the side wall of a recess formed for reception of the disk and serves to keep the spring under tension. The adjusting knob has a pair of pins 74 spaced 180° apart for engaging the teeth 71 and imparting rotary movement to the numbered disk when the liner is revolved to change the potential maximum size of the orifice. Certain of the recesses in the numbered disk are so formed that, when the pins 74 engage these particular recesses, further rotary movement of the knob will be precluded. The operator will then be informed that the limits of adjustability have been reached.

Figure 7:
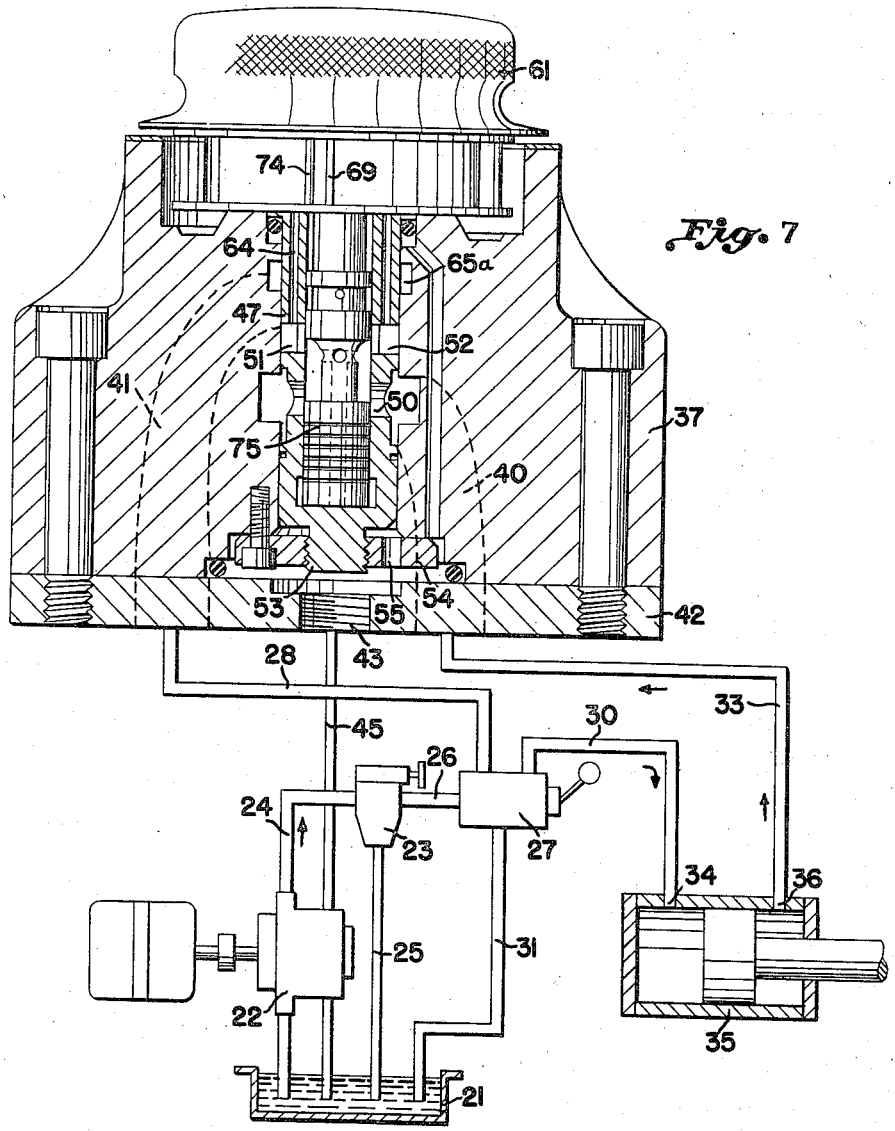
Fig. 7 is a diagrammatic view of a hydraulic system provided with a modified form of flow control valve, the valve in this figure being shown in vertical cross section.
Figure 8:
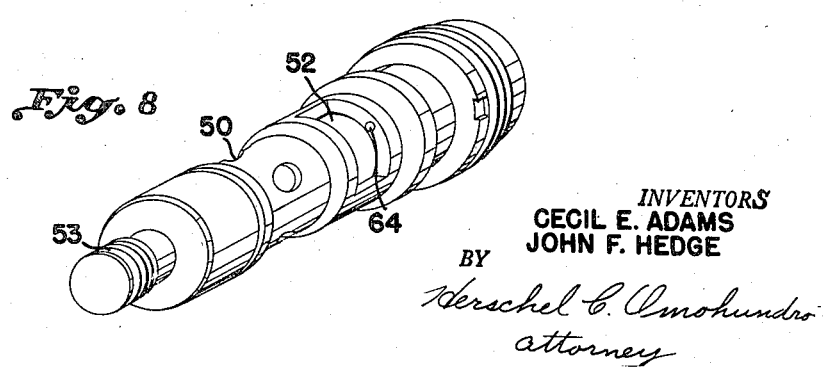
Fig. 8 is a perspective view of a liner element used in the valve shown in Fig. 5.

The form of the invention just described may be designated as a three-port type of flow control valve. This designation means that the valve controls the flow by by-passing part of the fluid supplied thereto, to the system reservoir. A two-port type of flow control valve has been illustrated in Fig. 7. This flow control valve is essentially the same as the first form described except the spool 75 does not have a fluid directing groove at its lower portion. The entire lower portion constitutes a single head interrupted only by sealing grooves. This type of valve controls the flow of fluid by restricting the size of the passage extending between the inlet and outlet ports thus resisting fluid flow through the passage. When this type of flow control valve is used, the excess fluid is directed back to the reservoir by the relief valve 23 which operates in response to an increase in fluid pressure beyond a predetermined value. When the control knob of either of the flow control valves shown in the drawing is adjusted to change the potential maximum size of the orifice, the valve is adapted for a different range of operation. The ranges are selected in the same manner in both of the valves shown, the valves operating substantially identically except for the diversion of the excess fluid through the third port in the first form whereas no fluid is diverted by the flow control valve of the second form.

The flow control feature of operation is only secured when fluid is permitted to flow into the inlet ports of the devices. The first form of the invention is provided with a check valve controlled passage 76 which permits fluid introduced into the outlet port 41 to flow directly to the inlet port without flowing through the bore 38. This passage is disclosed in detail in Fig. 4 wherein it will be observed that the body 37 is provided with a removable seat 77 for engagement by a spring-pressed ball 78. This ball permits fluid to flow from the passage 41 to the passage 40 but will prevent flow in the opposite direction. In the second form of the invention, fluid supplied to the outlet port must flow through the orifice and the bore 38 to the inlet port but, inasmuch as the pressure at the outlet side of the orifice is applied to the upper end of the control spool, this spool will be moved to a position to provide for maximum reverse flow through the valve. The flow control operation will not be secured upon reverse flow through the second form of the valve.

Figure 2:
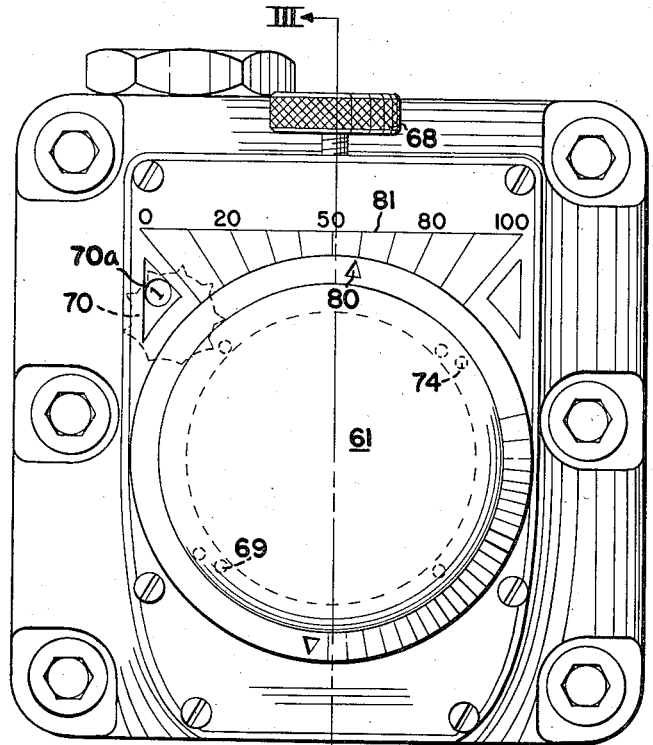
Fig. 2 is a plan view of the flow control valve shown in Fig. 1.

As shown in Fig. 2, the adjusting knob 61 is provided with arrow heads 80 which move over a graduated dial 81 to show the percentage of opening of the orifice selected. Two arrow heads are provided, one for each opening in the liner.

While the form of embodiment of the present invention as herein disclosed constitutes a preferred form, it is to be understood that other forms might be adopted, all coming within the scope of the claims which follow.

We claim:

1. Flow indicator means and a flow control valve including a body and means for adjusting the flow of fluid through said body, said adjusting means including means movable to different ranges to adjust the maximum potential flow of fluid through said valve and movable within the limits of said ranges to adjust the percentage of fluid flow within each of said ranges, said flow indicating means including a movable range indicia carrying member; means operated by movement of said adjusting means from one range to another to shift said range indicia carrying member from one position to another thereby to indicate that range in which said adjusting member is adjusted, and a percentage indicating indicia means including fixed indicia and indicia movable with said adjusting means to indicate the percentage of fluid flow within said ranges, said range indicia carrying member remaining in a fixed position while said percentage indicia means is being adjusted.

2. Flow indicator means and a flow control valve including a body and means for adjusting the flow of fluid through said body, said adjusting means including means movable to different ranges to adjust the maximum potential flow of fluid through said valve and movable within the limits of said ranges to adjust the percentage of fluid flow within each of said ranges, said flow indicating means including a movable range indicia carrying member; means operated by movement of said adjusting means from one range to another to shift said range indicia carrying member from one position to another thereby to indicate that range in which said adjusting member is adjusted; means for retaining said range indicia carrying member in its adjusted positions, and a percentage indicating indicia means including fixed indicia and indicia movable with said adjusting means to indicate the percentage of fluid flow within said ranges, said range indicia carrying member remaining in a fixed position while said percentage indicia means is being adjusted.

3. Flow indicator means and a flow control valve including a body and means for adjusting the flow of fluid through said body, said adjusting means including means movable to different ranges to adjust the maximum potential flow of fluid through said valve and movable within the limits of said ranges to adjust the percentage of fluid flow within each of said ranges, said flow indicating means including a movable range indicia carrying member; interengaging means on said range indicia carrying member and said adjusting means for moving said range carrying indicia member from one position to another upon movement of said adjusting means from one range to another thereby to indicate that range in which said adjusting member is adjusted, and a percentage indicating indicia means including fixed indicia and indicia movable with said adjusting means to indicate the percentage of fluid flow within said ranges, said range indicia carrying member remaining in a fixed position while said percentage indicia means is being adjusted.

4. Flow indicator means and a flow control valve including a body and means for adjusting the flow of fluid through said body, said adjusting means including means movable to different ranges to adjust the maximum potential flow of fluid through said valve and movable within the limits of said ranges to adjust the percentage of fluid flow within each of said ranges, said flow indicating means including a pivotally mounted range indicia carrying member; means operated by movement of said adjusting means from one range to another to shift said range indicia carrying member from one position to another thereby to indicate that range in which said adjusting member is adjusted; means for retaining said range indicia carrying member in its adjusted positions, and a percentage indicating indicia means including fixed indicia and indicia movable with said adjusting means to indicate the percentage of fluid flow within said ranges, said range indicia carrying member remaining in a fixed position while said percentage indicia means is being adjusted.

5. Flow indicator means and a flow control valve including a body and means for adjusting the flow of fluid through said body, said adjusting means including means movable to different ranges to adjust the maximum potential flow of fluid through said valve and movable within the limits of said ranges to adjust the percentage of fluid flow within each of said ranges, said flow indicating means including a movable range indicia carrying member; interengaging means on said range indicia carrying member and said adjusting means for moving said range carrying indicia member from one position to another upon movement of said adjusting means from one range to another thereby to indicate that range in which said adjusting member is adjusted; means for retaining said range indicia carrying member in its adjusted positions; means covering the indicia on said range carrying indicia member forming an opening through which an indicium on said member is visible, and a percentage indicating indicia means including fixed indicia and indicia movable with said adjusting means to indicate the percentage of fluid flow within said ranges, said range indicia carrying member remaining in a fixed position while said percentage indicia means is being adjusted.

References Cited in the file of this patent

UNITED STATES PATENTS

| | | |
|---|---|---|
| 776,769 | Wisbech | Mar. 9, 1904 |
| 1,019,747 | Barnes | Mar. 12, 1912 |
| 1,640,842 | Loomis | Aug. 30, 1927 |
| 1,674,743 | Rudolph | June 23, 1928 |
| 2,102,865 | Vickers | Dec. 21, 1937 |
| 2,476,720 | Gardiner | July 19, 1949 |
| 2,484,916 | Tucker | Oct. 18, 1949 |
| 2,673,422 | Adams | Mar. 30, 1954 |

FOREIGN PATENTS

| | | |
|---|---|---|
| 3,460 | Austria | Feb. 25, 1901 |
| 11,446 | Great Britain | of 1902 |